(12) United States Patent
Hencke

(10) Patent No.: US 12,434,812 B2
(45) Date of Patent: Oct. 7, 2025

(54) AERODYNAMIC SYSTEM FOR AN AIRCRAFT

(71) Applicant: Airbus Operations GmbH, Hamburg (DE)

(72) Inventor: Marc Hencke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/680,344

(22) Filed: May 31, 2024

(65) Prior Publication Data

US 2024/0400192 A1    Dec. 5, 2024

(30) Foreign Application Priority Data

May 31, 2023    (EP) ..................................... 23176359

(51) Int. Cl.
*B64C 9/02*        (2006.01)

(52) U.S. Cl.
CPC ...................... *B64C 9/02* (2013.01)

(58) Field of Classification Search
CPC ....... B64C 9/02; B64C 13/341; B64C 1/0009; B64C 9/00; B64C 9/16; B64C 9/22; B64C 2009/005
See application file for complete search history.

(56) References Cited

U.S. PATENT DOCUMENTS

| | | | | |
|---|---|---|---|---|
| 3,706,431 A * | 12/1972 | Smith | ........................ | B64C 9/16 244/216 |
| 10,059,463 B2 * | 8/2018 | Carbone | ............ | B64D 45/0005 |
| 2014/0097292 A1 | 4/2014 | Hauber et al. | | |
| 2015/0360769 A1 * | 12/2015 | Dege | ..................... | B64C 13/505 244/213 |
| 2018/0002028 A1 * | 1/2018 | Polcuch | ................ | F15B 11/205 |
| 2020/0172229 A1 * | 6/2020 | Polcuch | ................... | B64C 13/16 |
| 2021/0101671 A1 * | 4/2021 | Tsai | .......................... | B64C 9/02 |
| 2022/0227484 A1 | 7/2022 | Brewer et al. | | |

FOREIGN PATENT DOCUMENTS

| | | | | |
|---|---|---|---|---|
| CA | 2972608 A1 * | 12/2018 | .............. | B64C 9/22 |
| DE | 102012005423 A1 | 9/2013 | | |
| EP | 3756995 A1 * | 12/2020 | ............ | B64C 13/00 |
| GB | 2449172 A | 11/2008 | | |
| WO | 2008/001336 A1 | 1/2008 | | |

OTHER PUBLICATIONS

EESR for Application No. EP 23176359.0 dated Oct. 20, 2023. 7 pgs.

* cited by examiner

*Primary Examiner* — Assres H Woldemaryam
(74) *Attorney, Agent, or Firm* — Lerner David LLP

(57) ABSTRACT

An aerodynamic system includes a support structure and an aerodynamic component movably coupled to the support structure via first and second coupling units such that the aerodynamic component can be moved relative to the support structure. The first and second coupling units can transfer a load from the aerodynamic component to the support structure. The system further includes an auxiliary coupling unit coupled between the aerodynamic component and the support structure, and configured to switch from a decoupling state to a coupling state, wherein, in the decoupling state, a load transfer via the at least one auxiliary coupling unit is prevented, and wherein, in the coupling state, a load transfer via the at least one auxiliary coupling unit is enabled.

11 Claims, 2 Drawing Sheets

AERODYNAMIC SYSTEM FOR AN AIRCRAFT

FIELD OF THE INVENTION

The invention generally relates to movable aerodynamic structures. In particular, the invention relates to an aerodynamic system for an aircraft as well as to an aircraft comprising such an aerodynamic system.

BACKGROUND OF THE INVENTION

Movables like flap components for aircraft are usually exposed to strong aerodynamic loads during operation of the aircraft. For example, flap components are attached at a trailing edge region of an aircraft wing and provide specified cruise and high-lift configurations, wherein the flap components are adapted to be retracted and deployed depending on the current flight condition. The movables, e.g., the flaps, are usually coupled to a base structure via actuators which enable a movement of the movables relative to the base structure. These actuators are also designed to transfer the loads from the movable to the base structure during each operating condition of the movable.

US 2012/0012696 A1 and WO 2012/009087 A1 describe an aircraft flap actuator assembly which includes at least one fixed support, at least one track having a curvilinear track surface connected to the fixed support, at least one flap support adapted to traverse the curvilinear track surface, a trailing edge flap connected to the at least one flap support and a flap actuator engaging the at least one flap support.

BRIEF SUMMARY OF THE INVENTION

It may be seen as an object of the invention to improve the fail-safe characteristics of an aerodynamic system.

According to an aspect of the invention, an aerodynamic system for an aircraft is provided. The aerodynamic system comprises a support structure and an aerodynamic component which is movably coupled to the support structure via a first coupling unit and a second coupling unit. The first coupling unit and the second coupling unit are configured to move the aerodynamic component relative to the support structure between a first position and a second position, for example between a retracted position and an extended position. The first coupling unit and the second coupling unit are configured to transfer a load from the aerodynamic component to the support structure during an operation of the aircraft. The aerodynamic system further comprises at least one auxiliary coupling unit arranged and/or coupled between the aerodynamic component and the support structure. The at least one auxiliary coupling unit is configured to switch from a decoupling state to a coupling state, wherein, in the decoupling state, a load transfer from the aerodynamic component via the at least one auxiliary coupling unit to the support structure is prevented, and wherein, in the coupling state, a load transfer from the aerodynamic component via the at least one auxiliary coupling unit to the support structure is enabled.

The inventive aerodynamic system may provide a mechanism which couples the auxiliary coupling unit as soon as one of the first or the second coupling unit experiences a decoupling event in which the coupling functionality, e.g. the load transfer capability, of the one of the first or the second coupling unit is disabled for any reason. In particular, if one of the first or the second coupling unit experiences such a decoupling event, the aerodynamic component gets partially or fully decoupled from the support structure. Such a decoupling event may also be called a GRA (geared rotary actuator) freewheel or disconnect condition. Therefore, upon the decoupling event of the first or the second coupling unit, a load transfer via the first or second coupling unit which experienced the decoupling event may be restricted or even inhibited. Accordingly, any actuator that usually drives the aerodynamic component via the first or the second coupling unit cannot anymore contribute to driving the aerodynamic component after experiencing the decoupling event.

In other words, upon such a decoupling event of one of the first or the second coupling unit, one load path gets disabled. The inventive aerodynamic system may then provide a second or an additional load path via the auxiliary coupling unit, wherein the load path via the auxiliary coupling unit may be passively established. In particular, if one of the first or the second coupling unit experiences a decoupling event and the load transfer via the respective decoupled coupling unit gets disabled, this may lead to a movement of the aerodynamic component relative to the support structure since, at the point in time when the decoupling event occurs, a load transfer is only possible via the other non-decoupled coupling unit. In this situation, the aerodynamic component is moved relative to the support structure, for example due to the ongoing load applied onto the aerodynamic component until the auxiliary coupling unit gets engaged and provides the second load path in addition to the remaining load path of the non-decoupled coupling unit. The result is that again at least two coupling units, namely the auxiliary coupling unit and the non-decoupled coupling unit, mechanically couple the aerodynamic component to the support structure such that a load transfer can again be provided via at least two coupling units.

It is noted that a load path via the auxiliary coupling unit can also be actively established, for example based on a detection of a failure or decoupling event in one of the first or the second coupling unit. The load path via the auxiliary coupling unit may in this case be actively initiated by a drive mechanism that engages the auxiliary coupling unit.

Transferring a load via a coupling unit may encompass transferring an aerodynamic load that is acting on the aerodynamic component into the support structure, during operation of the aerodynamic system. For example, the aerodynamic component may be an aircraft movable, like a trailing-edge flap, a leading-edge slat, an aileron, a rudder, an elevator or a spoiler, which is subjected to an aerodynamic load. The aerodynamic load acts on the aerodynamic component and is transferred via the respective coupling unit into the support structure.

The auxiliary coupling unit may be seen as an additional coupling mechanism that does not transfer any loads between the aerodynamic component and the support structure until a freewheel or disconnect event in one of the first or the second coupling unit occurs. Therefore, the auxiliary coupling unit may switch from the decoupling state to the coupling state only if such a freewheel or disconnect event in one of the first or the second coupling unit occurs. Otherwise, the auxiliary coupling unit may remain inactive such that the inventive aerodynamic system may therefore provide a sleeping failsafe design.

According to an embodiment, the at least one auxiliary coupling unit is configured to switch from the decoupling state to the coupling state based on a decoupling event at one of the first coupling unit or the second coupling unit.

A decoupling event may be a freewheel or disconnect condition in the first coupling unit or in the second coupling unit in which parts of the first or the second coupling unit fail or become decoupled such that a load transfer through the respective coupling unit is restricted or inhibited. In particular, the first coupling unit or the second coupling unit may still mechanically or kinematically couple the aerodynamic component to the support structure, but a load transfer through the affected coupling unit is at least partially or fully inhibited. This means that the affected coupling unit may have more degrees of freedom in which the aerodynamic component can loosely move relative to the support structure in comparison to a normal operating condition of said coupling unit. This loosening via the affected first or second coupling unit may be compensated by the auxiliary coupling unit switching from the decoupling state to the coupling state.

According to an embodiment, the decoupling state of the at least one auxiliary coupling unit is defined by a decoupling of the aerodynamic component from the support structure via the at least one auxiliary coupling unit in such a way that the at least one auxiliary coupling unit provides at least one more degree of freedom than the first coupling unit or second coupling unit.

In particular, during the decoupling state of the at least one auxiliary coupling unit, the at least one auxiliary coupling unit provides at least one additional degree of freedom for which no load transfer is possible, when compared to the load transferability of the the first coupling unit or second coupling unit. This includes translational or rotational degrees of freedom.

Thus, in the decoupling state of the auxiliary coupling unit, i.e., during normal operation of the first and second coupling unit, the auxiliary coupling unit may have one additional degree of freedom for which no load can be transferred between the aerodynamic component and the support structure. For example, during normal operation, when each of the first and the second coupling unit has no degree of freedom in which no load can be transferred, the auxiliary coupling unit has at least one degree of freedom in which no load can be transferred.

According to an embodiment, each of the first coupling unit and the second coupling unit comprises an actuator which is configured to actively move the aerodynamic component relative to the support structure.

The actuator may be a geared rotary actuator that is driven by a drive shaft, e.g., a torque shaft. The actuator may thus initiate the movement of the aerodynamic component relative to the support structure. The actuator may be arranged at the support structure and may be configured to drive a linkage mechanism of the respective coupling unit that movably couples the aerodynamic component to the support structure.

According to an embodiment, the at least one auxiliary coupling unit comprises an actuator which is configured to actively move the aerodynamic component relative to the support structure when the at least one auxiliary coupling unit is in the coupling state.

This means that the auxiliary coupling unit may contribute to an active movement of the aerodynamic component relative to the support structure after the auxiliary coupling has switched from the decoupling state to the coupling state. The actuator of the at least one auxiliary coupling unit may also be a geared rotary actuator that is driven by the above-mentioned drive shaft during the coupling state of the at least one auxiliary coupling unit.

According to an embodiment, the aerodynamic system further comprises a drive shaft which is arranged at the support structure, wherein the actuator of the first coupling unit, the actuator of the second coupling unit and the actuator of the at least one auxiliary coupling unit are driven by the drive shaft.

In a freewheel or disconnect event of one of the first or the second coupling unit, the actuator of the affected coupling unit may become ineffective because the load transfer via the affected coupling unit may be restricted or inhibited. The actuator of the affected coupling unit may then be compensated by the actuator of the at least one auxiliary coupling unit.

According to an embodiment, the at least one auxiliary coupling unit comprises a mechanical linkage coupled between the aerodynamic component and the support structure, wherein the mechanical linkage is configured to initiate a switch from the decoupling state to the coupling state of the at least one auxiliary coupling unit by an engaging movement, e.g., by closing a gap, inside the mechanical linkage.

The engaging movement, e.g., the closing of the gap, may be initiated in reaction to a decoupling event of one of the first or the second coupling unit and an external load on the aerodynamic component which continues after the decoupling event. In other words, when the decoupling event in one of the first or the second coupling unit occurs, the aerodynamic component will still be subject to the same or a similar aerodynamic load, and the aerodynamic component will thus move relative to the support structure due to the decoupling of the affected coupling unit. This movement of the aerodynamic component continues until the engaging movement inside the mechanical linkage of the auxiliary unit has occurred, e.g., until the gap inside the mechanical linkage of the auxiliary coupling unit is closed, since then the mechanical linkage can transfer the load or a similar load that was actually transferred by the affected coupling unit before the decoupling event.

According to an embodiment, the at least one auxiliary coupling unit comprises two longitudinal connector elements, wherein the longitudinal connector elements are connected to each other in a connection region, wherein, in the decoupling state of the at least one auxiliary coupling unit, the connector elements are separated by a gap, for example the above-mentioned gap, in the connection region such that a load transfer in a longitudinal direction of at least one of the connector elements is prevented.

The gap may enable a free movement of the two connector elements in at least the longitudinal direction when the auxiliary coupling unit is in the decoupling state. It is noted that the gap may alternatively be arranged at other parts of the auxiliary coupling unit, for example in the actuator of the auxiliary coupling unit. In any case, the gap may allow a free, e.g., unloaded, movement of at least two components of the auxiliary coupling unit relative to each other with respect to at least one translational or rotational direction. This ensures the decoupling of the auxiliary coupling unit when it is in the decoupling state such that a load transfer via the auxiliary coupling unit in the decoupling state is restricted or inhibited. It is possible that a combination of different gaps may be distributed among the components of the auxiliary coupling unit to provide the above-explained decoupling state.

According to an embodiment, the at least one auxiliary coupling unit comprises a damper element arranged in the connection region between the two connector elements.

The damper element may damp or compensate peak loads occurring as a result of the decoupling event in one of the first or the second coupling unit, i.e., at the time when the auxiliary coupling unit switches from the decoupling state to the coupling state. In other words, the decoupling event in the affected first or second coupling unit and the ongoing aerodynamic load onto the aerodynamic component may accelerate the aerodynamic component, thereby provoking a peak load within the auxiliary coupling unit. This peak load can be absorbed by the damper element. The damper element may alternatively be arranged at other parts of the auxiliary coupling unit.

According to an embodiment, at least one of the first coupling unit or the second coupling unit comprises a sensor. Alternatively or additionally, the at least one auxiliary coupling unit comprises a sensor.

The sensor of the first coupling unit and/or the sensor of the second coupling unit may detect the above-explained decoupling event such that, for example, corresponding information may be provided to a flight control system. A decoupling event in one of the first or the second coupling unit may thus be considered for the further flight control.

The sensor of the auxiliary coupling unit may detect when the auxiliary coupling unit switches from the decoupling state to the coupling state and/or simply when the auxiliary coupling unit is in the coupling state. This detection may also provide an information to a flight control system that the auxiliary coupling unit is now transferring a load and/or that a decoupling event has occurred in one of the first coupling unit or the second coupling unit.

According to an aspect an aircraft comprising an aerodynamic system as described herein is provided. The aerodynamic component is one of a trailing-edge flap, a leading-edge slat, an aileron, a rudder or an elevator.

If the aerodynamic component is a trailing-edge flap, a leading-edge slat or an aileron, the support structure may represent a wing structure. If the aerodynamic component is a rudder or an elevator, the support structure may represent a vertical stabilizer or a horizontal stabilizer, respectively.

If the aerodynamic system is a trailing-edge system, the wing structure may be seen as the base system to which the trailing-edge flap is movably coupled. The wing structure may have a skin section with an aerodynamic outer surface. In particular, the wing structure has an aerodynamic upper surface and an aerodynamic lower surface. The upper and lower surfaces may be connected to each other via a leading edge at the front of the wing structure and via a trailing edge at the rear of the wing structure. The trailing edge flap may be a flap component, e.g., a flap or part of a flap, and may be arranged at the rear of the wing structure. For example, multiple trailing edge flaps are arranged next to each other along a spanwise extension direction of the wing structure. However, multiple trailing edge movables may also be arranged next to each other along a chordwise extension direction of the wing structure, wherein the trailing edge movables provide a series of trailing edge movables coupled to each other. The coupling units described herein may provide the mechanical and kinematical coupling of the trailing-edge flap to the wing structure. The coupling units may be arranged in juxtaposition along a spanwise direction of the wing structure.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
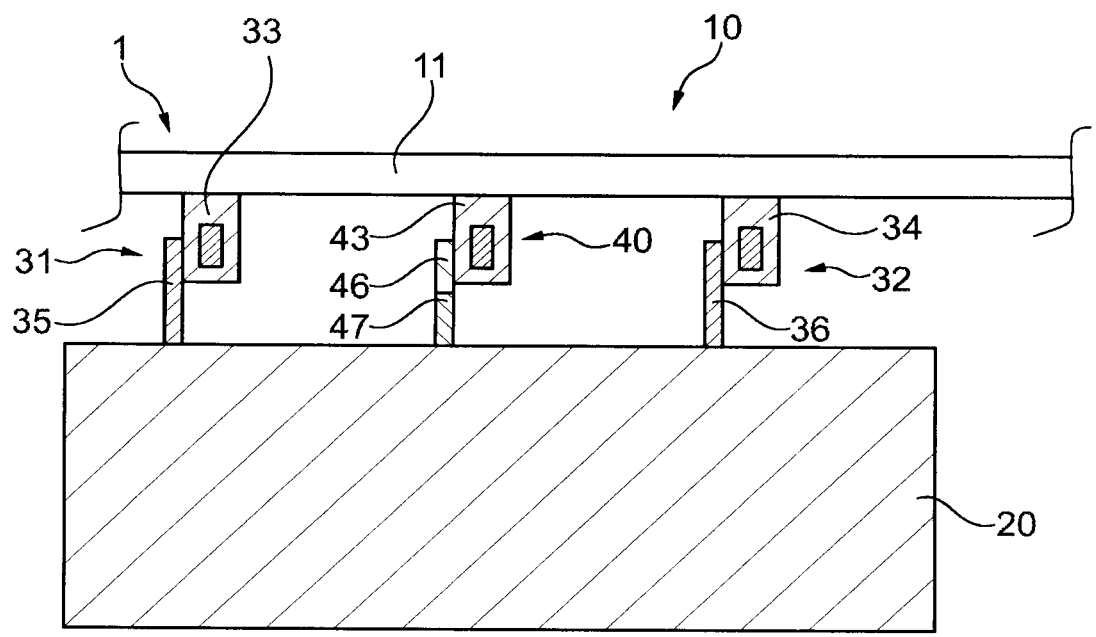
FIG. 1 shows a schematic of an aerodynamic system comprising two coupling units and an auxiliary coupling unit.

The representations and illustrations in the drawings are schematic and not to scale. A better understanding of the system described above may be obtained through a review of the illustrations accompanying this application together with a review of the detailed description that follows.

FIG. 1 shows a schematic of an aerodynamic system 1 comprising a support structure 10 and an aerodynamic component 20 which is movably coupled to the support structure via a first coupling unit 31 and a second coupling unit 32. The first coupling unit 31 and the second coupling 32 unit are configured to move the aerodynamic component 20 relative to the support structure 10 between a retracted position and an extended position. In the retracted position, the aerodynamic component 20 may be arranged closer with respect to the support structure 10 than in the extended position. The first coupling unit 31 and the second coupling unit 32 are configured to transfer a load from the aerodynamic component 20 into the support structure 10. The aerodynamic system 1 further comprises at least one auxiliary coupling unit 40 coupled between the aerodynamic component 20 and the support structure 10, wherein the at least one auxiliary coupling unit 40 is switchable from a decoupling state 41 to a coupling state 42 (cf. FIGS. 2 and 3), based on a load transfer capability of the first coupling unit 31 and/or the second coupling unit 32. In the decoupling state 41, a load transfer from the aerodynamic component 20 via the at least one auxiliary coupling unit 40 to the support structure 10 is prevented or inhibited. In the coupling state 42, a load transfer from the aerodynamic component 20 via the at least one auxiliary coupling unit 40 to the support structure 10 is enabled or activated. It is possible that the aerodynamic system 1 comprises two, three, four or more of said auxiliary coupling units.

When a decoupling event in the first coupling unit 31 or in the second coupling unit 32 occurs, for example in the form of freewheel or disconnect event in which a proper load transfer via the affected coupling unit 31 or 31 cannot be ensured anymore, the at least one auxiliary coupling unit 40 is configured to switch from the decoupling state 41 to the coupling state 42. Upon the decoupling event of the affected first or second coupling unit 31, 32 an aerodynamic load onto the aerodynamic component 20 may still be present. Due to the missing load transfer via the affected coupling unit 31 or 32, e.g., due to a loosening inside a mechanical linkage of the affected coupling unit 31 or 32, the aerodynamic component 20 may be shifted or moved until the auxiliary coupling unit 40 engages, i.e., switches from the decoupling state to the coupling state. This engaging movement may enable establishing a load transfer from the aerodynamic component 20 via the auxiliary coupling unit 40 into the support structure 10. This means that before the decoupling event in the first coupling unit 31 or in the second coupling unit 32 has occurred no load was transferred through the auxiliary coupling unit 40, while after the decoupling event in the first coupling unit 31 or in the second coupling unit 32 has occurred a load transfer through the auxiliary coupling unit 40 is enabled.

Each of the first coupling unit 31 and the second coupling unit 32 comprises an actuator 33, 34 which is configured to actively move the aerodynamic component 20 relative to the support structure 10. In particular, the first coupling unit 31 comprises a first actuator 33 and the second coupling unit 32 comprises a second actuator 34. Furthermore, the at least one auxiliary coupling unit 40 also comprises an actuator 43, for example an auxiliary actuator 43, which is configured to actively move the aerodynamic component 20 relative to the support structure 10 when the at least one auxiliary coupling unit 40 is in the coupling state 42. In other words, the auxiliary actuator 43 may become relevant only in the coupling state 42 of the auxiliary coupling unit 40 while, in the decoupling state 41 of the auxiliary coupling unit 40, the auxiliary actuator 43 may constantly remain inactive since a load transfer via the auxiliary coupling unit 40 cannot be established as long as the auxiliary coupling unit 40 is in the decoupling state 41.

The aerodynamic system 1 further comprises a drive shaft 11 in the form of a torque shaft which is arranged at the support structure 10. The first actuator 33 of the first coupling unit 31, the second actuator 34 of the second coupling unit 32 and the auxiliary actuator 43 of the at least one auxiliary coupling unit 40 are placed on the drive shaft 11 and/or are driven by the drive shaft 11. Upon being driven by the drive shaft 11, the first actuator 33 drives a linkage mechanism 35 of the first coupling unit 31, thereby controlling a movement of the aerodynamic component 20 relative to the support structure 10. The linkage mechanism 35 mechanically and/or kinematically couples the aerodynamic component 20 to the first actuator 33. Upon being driven by the drive shaft 11, the second actuator 34 drives a linkage mechanism 36 of the second coupling unit 32, thereby also controlling the movement of the aerodynamic component 20 relative to the support structure 10. The linkage mechanism 36 mechanically and/or kinematically couples the aerodynamic component 20 to the second actuator 34. In the decoupling state 41 of the auxiliary coupling unit 40, the movement of the aerodynamic component 20 relative to the support structure 10 is cooperatively controlled via the first coupling unit 31 and the second coupling unit 32 since both coupling units 31, 32 can still transfer loads. In contrast, during the coupling state 42 of the auxiliary coupling unit 40, e.g., during a decoupling event for example in the first coupling unit 31, the movement of the aerodynamic component 20 relative to the support structure 10 is cooperatively controlled only via the remaining second coupling unit 32 and the auxiliary coupling unit 40 since, then, the first coupling unit 31 is not able to transfer the required loads anymore and the auxiliary coupling unit 40 can be said to take over the function of the first coupling unit 31 and now transfers loads. Although the transferred load amount through the second coupling unit 32 may change in such a decoupling event of the first coupling unit 31, there will still be a reduction of dynamic load when compared to a conventional design. In addition, a movement of the aerodynamic component 20 relative to the support structure 10 is still possible such that a so-called flaps-up landing can be avoided. The decoupling state 41 and the coupling state 42 of the auxiliary coupling unit 40 will be described in more detail with respect to FIGS. 2 and 3 below.

Figure 2:
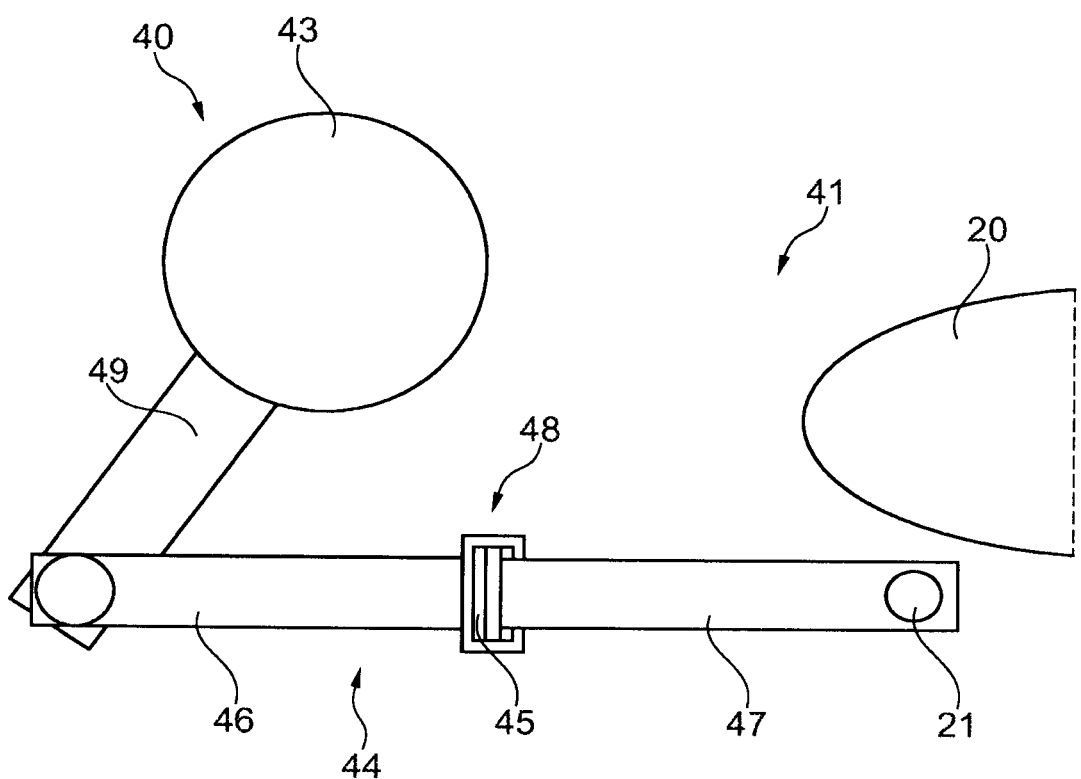
FIG. 2 shows a schematic of the auxiliary coupling unit of FIG. 1 in a decoupling state.
Figure 3:
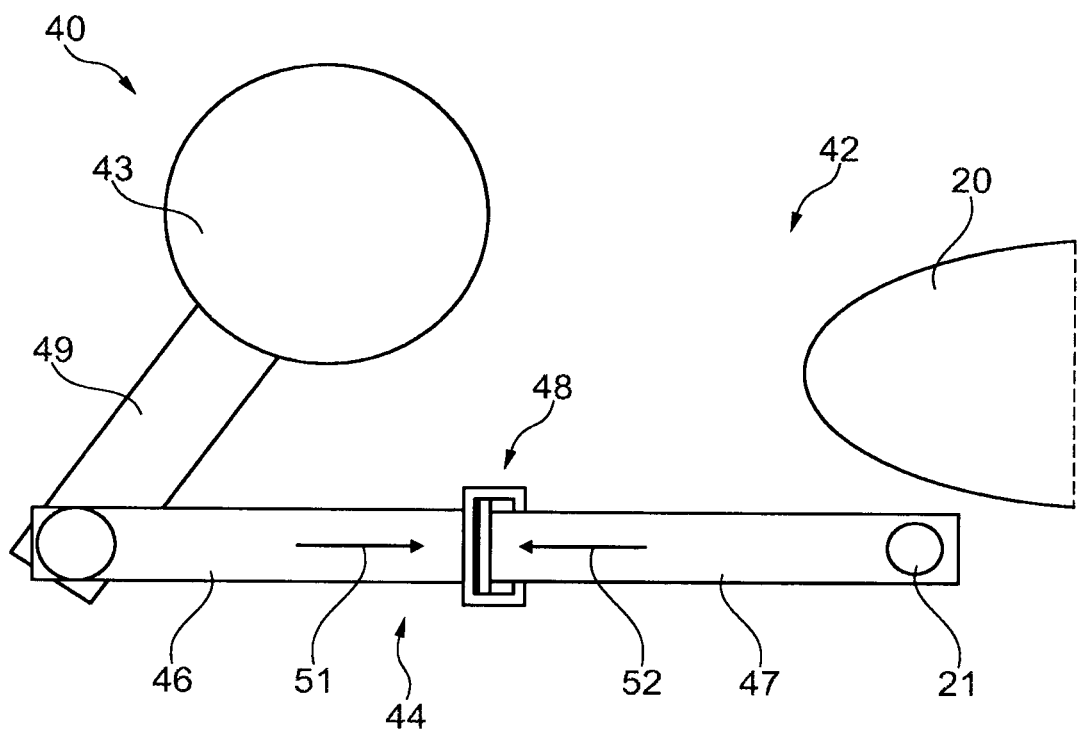
FIG. 3 shows a schematic of the auxiliary coupling unit of FIG. 1 in a coupling state.

FIG. 2 shows a schematic of the auxiliary coupling unit 40 of FIG. 1 in the decoupling state 41 while FIG. 3 shows a schematic of the auxiliary coupling unit 40 of FIG. 1 in the coupling state 42. The auxiliary coupling unit 40 comprises a mechanical linkage 44 which mechanically and/or kinematically couples the aerodynamic component 20 to the support structure 10. The mechanical linkage 44 that is configured to initiate a switch from the decoupling state 41 to the coupling state 42 of the auxiliary coupling unit 40. In the example shown in FIGS. 2 and 3, a gap 45 inside the mechanical linkage 44 is closed to switch the auxiliary coupling unit 40 from the decoupling state 41 to the coupling state 42. In particular, the auxiliary coupling unit 40 comprises two longitudinal connector elements 46, 47, i.e., a first longitudinal connector element 46 and a second longitudinal connector element 47, wherein the longitudinal connector elements 46, 47 are connected to each other in a connection region 48 where the gap 45 is located.

In the decoupling state 41 of the auxiliary coupling unit 40, the connector elements 46, 47 are spaced apart from each other by the gap 45 in their longitudinal directions. Thus, due to the gap 45, a load cannot be transferred in the longitudinal directions of the connector elements 46, 47. In other words, the connector elements 46, 47 are freely movable relative to each other in their longitudinal directions.

As soon as one of the first coupling unit 31 or the second coupling unit 32 experiences a decoupling event as described above with respect to FIG. 1, the aerodynamic component 20 will be moved relative to the support structure 10. For example, the aerodynamic loads onto the aerodynamic component 20 will move or push the aerodynamic component 20 closer towards the support structure 10. This movement may thus move second connector element 47 towards the first connector element 46, thereby closing the gap 45 as shown in FIG. 3. Thus, the auxiliary coupling unit 40 passively switches from the decoupling state 41 (cf. FIG. 2) to the coupling state 42 (cf. FIG. 3). The passive switch may be initiated by the decoupling event in the affected coupling unit 31 or 32 in conjunction with the ongoing aerodynamic load on the aerodynamic component 20 which moves or pushes the aerodynamic component 20 towards the support structure 10, resulting in an engagement of the two connector elements 46, 47 in the auxiliary coupling unit 40.

In the coupling state 42 of the auxiliary coupling unit 40 shown in FIG. 3, the connector elements 46, 47 are in contact with each other in the connection region 48 such that a load transfer 51, 52 (indicated by arrows) in the longitudinal direction of the connector elements 46, 47 is enabled.

The mechanical linkage 44 of the auxiliary coupling unit 40 may further comprise a connecting strut 49 which movably couples the auxiliary actuator 43 with the first connector element 46 as well as a coupling element 21 which movably couples the aerodynamic component 20 to the second connector element 47. A sensor may be arranged inside the mechanical linkage 44, or for example at either end of the mechanical linkage 44, to monitor the system condition, i.e., whether the decoupling state 41 has switched to the coupling state 42.

While the example of FIGS. 2 and 3 includes the gap 45 between two connector elements 46, 47 of the auxiliary coupling unit 40, it should be understood, that this is merely an example and that such a gap 45 can be located at any other position within the auxiliary coupling unit 40, for example at the auxiliary actuator 43, at the connecting strut 49 or at the coupling element 21. The gap 45 is also merely an example so that similar configurations may be employed which can provide the above-described coupling and decoupling states 41, 42.

As can be seen from the above explanations, the inventive aerodynamic system 1 is configured provide a second load path 51, 52 during a GRA freewheel or disconnect event in the first coupling unit 31 or in the second coupling unit 32.

In addition, sensors may provide a failure or disconnect detection in the affected coupling unit 31 or 32 and one or more dampers in the auxiliary coupling unit 40 may lower peak loads or deformations occurring when the auxiliary coupling unit 40 switches from the decoupling state 41 to the coupling state 42, i.e., when the first connector element 46 gets in contact with the second connector element 47. As long as the two coupling units 31, 32 are active and transfer loads, no loads may be transferred through the auxiliary coupling unit 40, so it may be configured as a so-called sleeping failsafe design. Once a GRA freewheel or disconnect event in one of the first coupling unit 31 or in the second coupling unit 32 occurs, a specified gap 45 inside the mechanical linkage 44 of the auxiliary coupling unit 40 will be closed and the other of the first coupling unit 31 or the second coupling unit 32 together with the auxiliary coupling unit 40 become active in terms of load transfer.

The auxiliary coupling unit 40 may be placed at any position along the support structure 10, for example between the two coupling units 31, 32 as shown in FIG. 1, or the first coupling unit 31 may be arranged between the second coupling unit 32 and the auxiliary coupling unit 40, or the second coupling unit 32 may be arranged between the first coupling unit 31 and the auxiliary coupling unit 40. The aerodynamic system 1 may comprise more coupling units in addition to the first and second coupling units 31, 32. The aerodynamic system 1 may be configured to operate at any deployment angle between the support structure 10 and the aerodynamic component 20. Furthermore, the auxiliary coupling unit 40 may be integrated into the aerodynamic system 1 independently of any other coupling unit next to it.

Figure 4:
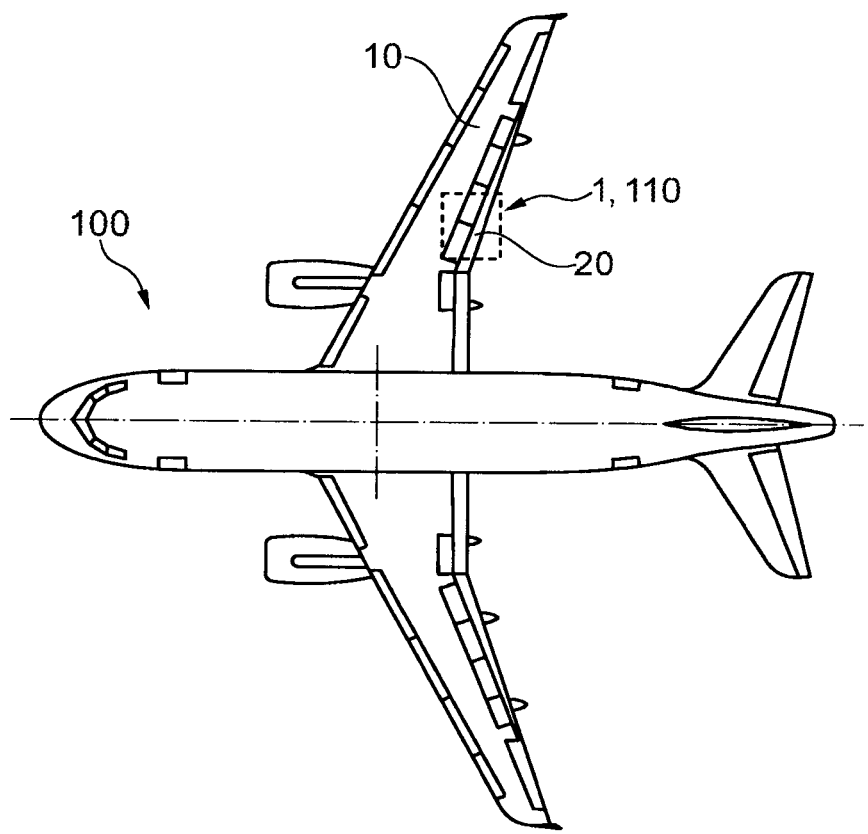
FIG. 4 shows an aircraft comprising the aerodynamic system of FIG. 1.

FIG. 4 shows an aircraft 100 comprising the aerodynamic system 1 of FIG. 1, wherein, in this example, the aerodynamic system 1 is a trailing-edge system 110. The aircraft 100 comprises the support structure 10 in the form of an aircraft wing, wherein the aerodynamic component 20 is a trailing-edge flap.

The invention claimed is:

1. An aerodynamic system for an aircraft, comprising:
   a support structure;
   an aerodynamic component movably coupled to the support structure via a first coupling unit and a second coupling unit;
   wherein the first coupling unit and the second coupling unit are configured to move the aerodynamic component relative to the support structure between a first position and a second position;
   wherein the first coupling unit and the second coupling unit are configured to transfer a load from the aerodynamic component to the support structure during an operation of the aircraft;
   at least one auxiliary coupling unit coupled between the aerodynamic component and the support structure;
   wherein the at least one auxiliary coupling unit is configured to switch from a decoupling state to a coupling state;
   wherein, in the decoupling state, a load transfer from the aerodynamic component via the at least one auxiliary coupling unit to the support structure is prevented;
   wherein, in the coupling state, a load transfer from the aerodynamic component via the at least one auxiliary coupling unit to the support structure is enabled, and
   wherein the at least one auxiliary coupling unit comprises an actuator configured to actively move the aerodynamic component relative to the support structure when the at least one auxiliary coupling unit is in the coupling state.

2. The aerodynamic system of claim 1,
   wherein the at least one auxiliary coupling unit is configured to switch from the decoupling state to the coupling state based on a decoupling event at one of the first coupling unit or the second coupling unit.

3. The aerodynamic system according to claim 1,
   wherein the decoupling state of the at least one auxiliary coupling unit is defined by a decoupling of the aerodynamic component from the support structure via the at least one auxiliary coupling unit in such a way that the at least one auxiliary coupling unit provides at least one more degree of freedom than the first coupling unit or second coupling unit.

4. The aerodynamic system according to claim 1,
   wherein each of the first coupling unit and the second coupling unit comprises an actuator configured to actively move the aerodynamic component relative to the support structure.

5. The aerodynamic system according to claim 1,
   wherein each of the first coupling unit and the second coupling unit comprises an actuator configured to actively move the aerodynamic component relative to the support structure,
   the system further comprising:
   a drive shaft arranged at the support structure;
   wherein the actuator of the first coupling unit, the actuator of the second coupling unit and the actuator of the at least one auxiliary coupling unit are configured to be driven by the drive shaft.

6. The aerodynamic system according to claim 1,
   wherein the at least one auxiliary coupling unit comprises a mechanical linkage coupled between the aerodynamic component and the support structure;
   wherein the mechanical linkage is configured to initiate a switch from the decoupling state to the coupling state of the at least one auxiliary coupling unit by an engaging movement inside the mechanical linkage.

7. An aerodynamic system for an aircraft, comprising:
   a support structure;
   an aerodynamic component movably coupled to the support structure via a first coupling unit and a second coupling unit;
   wherein the first coupling unit and the second coupling unit are configured to move the aerodynamic component relative to the support structure between a first position and a second position;
   wherein the first coupling unit and the second coupling unit are configured to transfer a load from the aerodynamic component to the support structure during an operation of the aircraft;
   at least one auxiliary coupling unit coupled between the aerodynamic component and the support structure;
   wherein the at least one auxiliary coupling unit is configured to switch from a decoupling state to a coupling state;
   wherein, in the decoupling state, a load transfer from the aerodynamic component via the at least one auxiliary coupling unit to the support structure is prevented;
   wherein, in the coupling state, a load transfer from the aerodynamic component via the at least one auxiliary coupling unit to the support structure is enabled,
   wherein the at least one auxiliary coupling unit comprises first and second longitudinal connector elements;
   wherein the first and second longitudinal connector elements are connected to each other in a connection region; and wherein, in the decoupling state of the at least one auxiliary coupling unit, the first and second longitudinal connector elements are separated by a gap in the connection region such that a load transfer in a longitudinal direction of at least one of the first and second longitudinal connector elements is prevented.

8. The aerodynamic system according to claim 7,
wherein the at least one auxiliary coupling unit comprises a damper element arranged in the connection region between the first and second longitudinal connector elements.

9. The aerodynamic system according to claim 1,
wherein at least one of the first coupling unit or the second coupling unit comprises a sensor; and/or
wherein the at least one auxiliary coupling unit comprises a sensor.

10. An aircraft comprising an aerodynamic system according to claim 1,
wherein the aerodynamic component is a trailing-edge flap, a leading-edge slat, an aileron, a rudder or an elevator.

11. An aircraft comprising an aerodynamic system according to claim 7,
wherein the aerodynamic component is a trailing-edge flap, a leading-edge slat, an aileron, a rudder or an elevator.

* * * * *